(12) United States Patent
Wise

(10) Patent No.: US 7,688,461 B2
(45) Date of Patent: Mar. 30, 2010

(54) DISTRIBUTED PERIPHERAL DEVICE CONTROL SYSTEM AND METHOD

(75) Inventor: Michio Wise, Buckinghamshire (GB)

(73) Assignee: Sharp Kabushiki Kaisha, Osaka (JP)

( * ) Notice: Subject to any disclaimer, the term of this patent is extended or adjusted under 35 U.S.C. 154(b) by 1744 days.

(21) Appl. No.: 10/828,111

(22) Filed: Apr. 20, 2004

(65) Prior Publication Data

US 2004/0239986 A1 Dec. 2, 2004

(30) Foreign Application Priority Data

Apr. 22, 2003 (GB) ................. 0309045.3

(51) Int. Cl.
*G06F 15/00* (2006.01)
*G06F 13/00* (2006.01)
(52) U.S. Cl. ..................... 358/1.15; 711/162
(58) Field of Classification Search ............... 358/1.15, 358/401; 370/401, 412, 389, 255, 390, 392, 370/363, 328, 338, 235, 400; 711/162, 100, 711/148, 173, 165, 153, 1, 421, 434; 710/1, 710/31, 22, 30, 52, 104; 709/230, 231, 224
See application file for complete search history.

(56) References Cited

U.S. PATENT DOCUMENTS

2008/0008202 A1* 1/2008 Terrell et al. ................. 370/401

FOREIGN PATENT DOCUMENTS

| EP | 1 083 478 | 3/2001 |
|---|---|---|
| EP | 1 249 803 A2 | 10/2002 |
| EP | 1 291 786 | 3/2003 |
| GB | 2365599 | 2/2002 |
| JP | 60-21029 | 2/1985 |
| JP | 07-287115 | 10/1995 |
| JP | 08-248410 | 9/1996 |
| WO | 02/41107 | 5/2002 |

OTHER PUBLICATIONS

European Search Report for corresponding Application No. 04101667.6 dated Nov. 15, 2006.
Chinese Office Action for Application No. 200410043018.6 dated Feb. 10, 2006.
Japanese Office Action for corresponding application 8-270309 dated Aug. 18, 2004.

* cited by examiner

*Primary Examiner*—Saeid Ebrahimi Dehkordy
(74) *Attorney, Agent, or Firm*—Renner, Otto, Boisselle & Sklar, LLP

(57) ABSTRACT

A distributed peripheral device control method for controlling the interaction between an information device and a peripheral device in communication with the information device, comprising requesting the peripheral device to perform a specified task, sending device identification information identifying the peripheral device to a server, selecting a device driver corresponding to the peripheral device in dependence upon the device identification information, establishing a virtual port at the server to form part of a communications link between the server and the information device and associating the virtual port with the selected device driver, employing the server to perform, using the selected device driver, peripheral device-dependent processing operations relating to the performance of the task to produce device-dependent data, and sending the device-dependent data to the virtual port for onward transmission to the peripheral device via the information device to enable the peripheral device to perform the specified task.

63 Claims, 5 Drawing Sheets

DISTRIBUTED PERIPHERAL DEVICE CONTROL SYSTEM AND METHOD

This non-provisional application claims priority under 35 U.S.C., §119(a), on Patent Application No. 0309045.3 filed in Great Britain on Apr. 22, 2003, the entire contents of which are hereby incorporated by reference.

BACKGROUND OF THE INVENTION

1. Field of the Invention

The present invention relates to a distributed peripheral device control system and method.

2. Description of the Related Art

A device having the capability to print a document typically requires access to the following information and software: (a) the document data; (b) application software capable of loading and processing the document, together with other data, such as fonts, required to render the document; (c) operating system graphical and printing software, used by the application software to produce output in a displayable form; and (d) device drivers, which are the software modules used by a printing system to produce output suitable to a given type (make and model) of printer; each type of printer may require a different device driver.

These programs and data generally consume large amounts of computer memory and disk space, and preparing the document for printing can require a considerable amount of processing.

A typical mobile information device, such as a Personal Digital Assistant (PDA) or mobile phone, is much more limited in resources and processing speed than a desktop machine, and therefore not capable of locally supporting fully functional printing of most document types. Furthermore, with increased availability of wireless connection technologies, such as IrDA, Bluetooth and wireless LANs, the user of a mobile device potentially has access to a wider range of printers, on an ad-hoc basis.

Hand-held PDAs typically have cut-down document processing and printing capabilities, with limited document-viewer applications and system software using generic, "lowest common denominator" printer drivers. Smaller devices, such as mobile phones, normally have no printing or document processing ability at all.

FIG. 1 of the accompanying drawings shows a typical arrangement for printing from a personal computer (PC) 2 to a locally-connected printer 12. The following description of a typical printing process using the apparatus shown in FIG. 1 is based on the Microsoft® Windows® operating system.

The application program 4 issues graphical commands known as Graphical Device Interface (GDI) commands to the operating system. When sufficient GDI commands have been received by the operating system 6 to render a complete page, the data is converted into Device Driver Interface (DDI) commands that are sent to the device driver 8. The device driver 8 converts these DDI commands into raw device commands (printer commands). The raw device commands (printer commands) are returned to the operating system 6, which sends the data through the printer port 10 to the printer 12 for printing.

With this arrangement, all the software required for printing is located on the PC 2. Before printing can take place, the system must be set up by installing the device driver 8 for the particular printer 12 attached to the PC 2 and configuring the printer port 10 to which the printer 12 is connected.

FIG. 2 of the accompanying drawings shows an arrangement for printing from a PC 2 on a network to a printer 12 connected to a server 14 on the network. The arrangement enables the PC 2 to print to any one of a number of printers connected to servers on the network. U.S. Pat. No. 5,699,495, entitled "Point-and-print in a distributed environment", describes a system using this arrangement.

The arrangement of FIG. 2 differs in two key respects from that described with reference to FIG. 1. Firstly, the device driver 8 is initially stored on the server 14 and is transferred over the network by the operating system 16 of the server 14 only when required by the client (i.e. the PC 2). Secondly, the raw device commands (printer commands) output by the device driver 8 are transferred over the network to the server 14, which sends the commands through the printer port 10 to which the printer 12 is connected.

U.S. Pat. No. 6,201,611, entitled "Providing local printing on a thin client", describes a system for printing to a locally-connected printer, but using resources located on a server to provide much of the processing. Application software running on the client issues graphical commands to the client operating system. Rather than calling a local device driver to produce raw print data, the commands are converted to a device-independent print file. The device-independent data are then sent over the network to the server, which converts the device-independent data to device-dependent data, using device drivers located on the server. The device-dependent data are then transferred from the server to the printer via the client. Local spooling of print data on the client is avoided by controlling the flow of device-dependent data from server to client. The printer may be connected to a client other than that to which the application is running. No method of ad-hoc printer configuration is described in U.S. Pat. No. 6,201,611. It is assumed that the server (or another server on the network) has been configured with the driver for the given printer.

US-A-2002/0018234, entitled "Printer driver system for remote printing", describes a system in which print jobs are processed on a server, using a "universal" printer driver installed on the server, to produce a universal print file, which is a generic type of file that can be sent directly to the printer.

EP-A-1291786, GB-A-2365599, WO 01/042894, WO 02/041107 and JP-2003-114773 can each be considered to disclose a distributed peripheral device control method for controlling the interaction between an information device and a peripheral device in communication with the information device, comprising requesting the peripheral device to perform a specified task, sending device identification information identifying the peripheral device to a server in communication with the information device, the server having access to at least one peripheral device driver, selecting a device driver corresponding to the peripheral device in dependence upon on the device identification information, employing the server to perform, on behalf of the information device and using the selected device driver, peripheral device-dependent processing operations relating to the performance of the task to produce device-dependent data.

US 2002/0196478 discloses a system comprising a mobile computing device, a scanner or multi-function printer and a server. The scanner scans a paper document into an electronic document which is sent to the server. No device-dependent processing is required by the server, which acts as a temporary store before the electronic document is retrieved by the mobile computing device. The mobile computing device does not act as a gateway between the scanner and the server.

SUMMARY OF THE INVENTION

According to a first aspect of the present invention, there is provided a distributed peripheral device control method for controlling the interaction between an information device and a peripheral device in communication with the information device, comprising requesting the peripheral device to perform a specified task, sending device identification information identifying the peripheral device to a server in communication with the information device, the server having access to at least one peripheral device driver, selecting a device driver corresponding to the peripheral device in dependence upon the device identification information, establishing a virtual port at the server to form part of a communications link between the server and the information device and associating the virtual port with the selected device driver, employing the server to perform, on behalf of the information device and using the selected device driver, peripheral device-dependent processing operations relating to the performance of the task to produce device-dependent data, and sending the device-dependent data to the virtual port for onward transmission to the peripheral device via the information device to enable the peripheral device to perform the specified task.

The virtual port may be established and associated with the selected device driver so as to appear to an operating system of the server to be an interface to a physical port to which the peripheral device is attached but wherein any data sent to the virtual port are forwarded to the information device over the communications link rather than directly to the peripheral device.

The server may have access to a plurality of applications, and the method may further comprise the step of selecting an application in dependence upon the specified task to be performed, and the device-dependent processing operations may be performed in interaction with the selected device driver under the control of the selected application. The application need not perform any device-independent processing operations.

The server may have access to a plurality of applications for performing device-independent processing operations and the method may comprise the steps of selecting an application and employing the server to perform device-independent processing operations on behalf of the information device using the selected application. The application may be selected in dependence upon the specified task to be performed.

The method may further comprise the step of buffering the device-dependent data at the server to control the rate at which the data are sent to the information device. The buffering of the device-dependent data at the server may be controlled in dependence upon a control signal received from the peripheral device indicating the state of the peripheral device. The buffering of the device-dependent data at the server may be controlled in dependence upon the fullness of a memory used to buffer the device-dependent data at the information device.

The method may further comprise the step of buffering the device-dependent data at the information device to control the rate at which the data are sent to the peripheral device. The information device preferably begins to send device-dependent data to the peripheral device before all the device-dependent data necessary to perform the specified task are received from the server.

The method may further comprise the steps of compressing the device-dependent data at the server and decompressing the device-dependent data at the information device.

The method may further comprise the step of processing of the device-dependent data at the information device before sending it to the peripheral device. Therefore the device-dependent data sent to the peripheral device may not be identical to the device-dependent data received at the information device.

The peripheral device may comprise an output device.

The peripheral device may be a printer, in which case the specified task may be to perform a printing operation to print a selected document and the device-dependent data may be printer commands. The method may further comprise the step of sending the selected document from the information device to the server, or may further comprise the step of retrieving the selected document from a document server. The document server may be located in a separate device that is accessible by the server. The application may be selected by examining the document type, for example by examining the filename extension of the document.

The peripheral device may comprise an input device. In this case, the method may further comprise the steps of performing a specified task at the peripheral device to produce device-dependent data and sending the device-dependent data to the information device for onward transmission to the server. The device-dependent operations performed at the server may be for processing the device-dependent data to produce device-independent data for use by the selected application. The application may be selected in dependence upon on the specified task performed at the peripheral device. The rate at which device-dependent data are sent to the information device may be controlled in dependence upon a control signal received from the information device indicating the state of the information device. The rate at which device-dependent data are sent to the information device may be controlled in dependence upon the fullness of a memory used to buffer the device-dependent data at the information device. The method may further comprise the step of buffering the device-dependent data at the information device to control the rate at which the data are sent to the server. The method may further comprise the steps of compressing the device-dependent data at the information device and decompressing the device-dependent data at the server. The method may further comprise the step of processing of the device-dependent data at the information device before sending it to the server.

The input device may be a scanner, the specified task may be to perform a scanning operation to scan a document, and the device-dependent data may be scanner commands for controlling the scanner to perform the specified task.

According to a second aspect of the present invention, there is provided a distributed peripheral device control method for controlling the interaction between an information device and a peripheral device in communication with the information device, comprising requesting the peripheral device to perform a specified task to produce device-dependent data, sending device identification information identifying the peripheral device to a server in communication with the information device, the server having access to at least one peripheral device driver, selecting a device driver corresponding to the peripheral device in dependence upon the device identification information, establishing a virtual port at the server to form part of a communications link between the server and the information device and associating the virtual port with the selected device driver, sending the device-dependent data from the peripheral device to the server via the information device for receipt at the virtual port, employing the server to perform, on behalf of the information device and using the selected device driver, peripheral device-dependent processing operations on the device-dependent data received at the virtual port.

The virtual port may be established and associated with the selected device driver so as to appear to an operating system of the server to be an interface to a physical port to which the peripheral device is attached such that any data received at the virtual port appears to originate from the peripheral device.

The server may have access to a plurality of applications, the method may further comprise the step of selecting an application in dependence upon on the specified task performed at the peripheral device, and the device-dependent processing operations may be performed in interaction with the selected device driver under control of the selected application. The application need not perform device-independent processing operations.

The server may have access to a plurality of applications for performing device-independent processing operations, and may comprise the steps of selecting an application and employing the server to perform device-independent processing operations on behalf of the information device using the selected application.

The device-dependent operations performed at the server may be for processing the device-dependent data to produce device-independent data for use by the selected application.

The peripheral device may comprise an input device for producing the device-dependent data.

The input device may be a scanner and the specified task may be to perform a scanning operation to scan a document.

In the first or second aspects, the communication link may be a first communication link and the information device may be in communication with the peripheral device via a second communication link and the method may further comprise the step of creating a virtual port at the information device for forming part of the second communication link.

The communication link may be a first communication link and the information device may be in communication with the peripheral device via a second communication link and the method may further comprise the step of creating a virtual port at the information device for forming part of the first communication link.

The method may further comprise the step of obtaining the device identification information from the peripheral device by Plug and Play specifications. At least one of the plurality of peripheral device drivers may be located in the server. At least one of the plurality of peripheral device drivers may be located in a separate device driver server that is accessible by the server. The steps of the method may be controlled by the information device. The or each virtual port may be established under the control of the information device. The method may further comprise the step of performing peripheral device-independent processing operations at the information device.

The server may have access to a plurality of peripheral device drivers.

The first and second communication links may be wireless links, for example Bluetooth, IrDA or WiFi links. It may conform to the IEEE 802.11 standard.

On the other hand, the first and second communication links may be physical links, for example USB or serial cable links.

The first and second communication links may be telecommunication links, for example mobile telecommunications and/or Internet links.

The information device may be a resource-limited information device and may also be a portable information device, for example a Personal Digital Assistant or a mobile phone.

According to a third aspect of the present invention, there is provided a distributed peripheral device control system for controlling the interaction between an information device of the system and a peripheral device of the system in communication with the information device, comprising a portion which requests the peripheral device to perform a specified task, a portion which sends device identification information identifying the peripheral device to a server in communication with the information device, the server having access to at least one peripheral device driver, a portion which selects a device driver corresponding to the peripheral device in dependence upon the device identification information, a portion which establishes a virtual port at the server to form part of a communications link between the server and the information device and associates the selected device driver with the virtual port, a portion which employs the server to perform, on behalf of the information device and using the selected device driver, peripheral device-dependent processing operations relating to the performance of the task to produce device-dependent data, and a portion which sends the device-dependent data to the virtual port for onward transmission to the peripheral device via the information device to enable the peripheral device to perform the specified task.

According to a fourth aspect of the present invention, there is provided a distributed peripheral device control system for controlling the interaction between an information device of the system and a peripheral device of the system in communication with the information device, comprising a portion which requests the peripheral device to perform a specified task to produce device-dependent data, a portion which sends device identification information identifying the peripheral device to a server in communication with the information device, the server having access to at least one peripheral device driver, a portion which selects a device driver corresponding to the peripheral device in dependence upon the device identification information, a portion which establishes a virtual port at the server to form part of a communications link between the server and the information device and associates the selected device driver with the virtual port, a portion which sends the device-dependent data from the peripheral device to the server via the information device for receipt at the virtual port, and a portion which employs the server to perform, on behalf of the information device and using the selected device driver, peripheral device-dependent processing operations on the device-dependent data received at the virtual port.

According to a fifth aspect of the present invention, there is provided an operating program for controlling an information processing device or a distributed peripheral device control system to perform a method according to the first or second aspect of the present invention. The operating program may be carried on a carrier medium, for example a transmission medium or storage medium.

According to a sixth aspect of the present invention, there is provided an information processing device adapted for use in a method according to the first or second aspect of the present invention.

According to a seventh aspect of the present invention, there is provided a server adapted for use in a method according to the first or second aspect of the present invention.

DETAILED DESCRIPTION OF THE PREFERRED EMBODIMENTS

Figure 1:
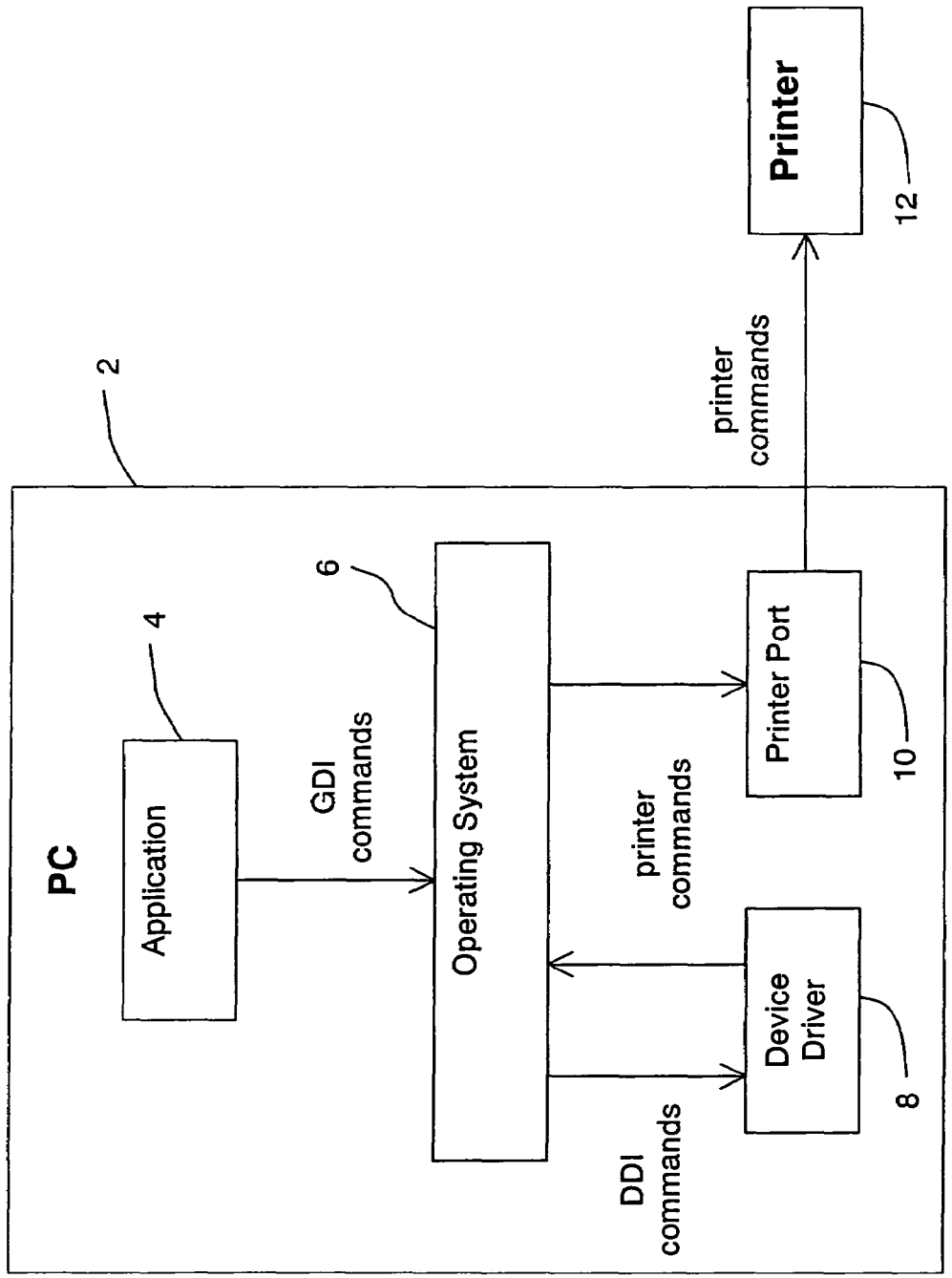
FIG. 1, discussed hereinbefore, shows a typical arrangement for printing from a personal computer to a locally-connected printer.
Figure 2:
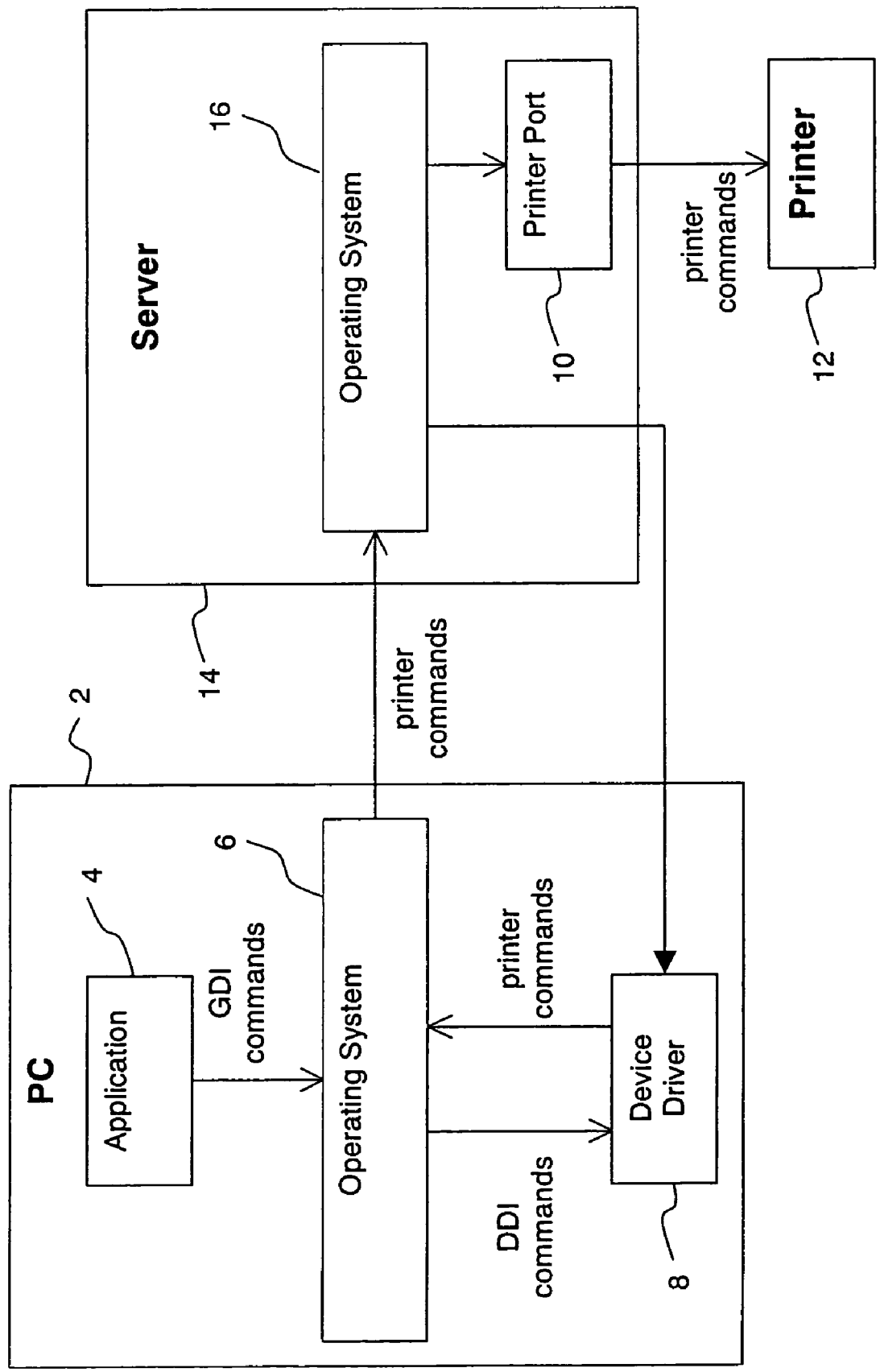
FIG. 2, also discussed hereinbefore, shows an arrangement for printing from a personal computer on a network to a printer connected to a server on the network.
Figure 3:
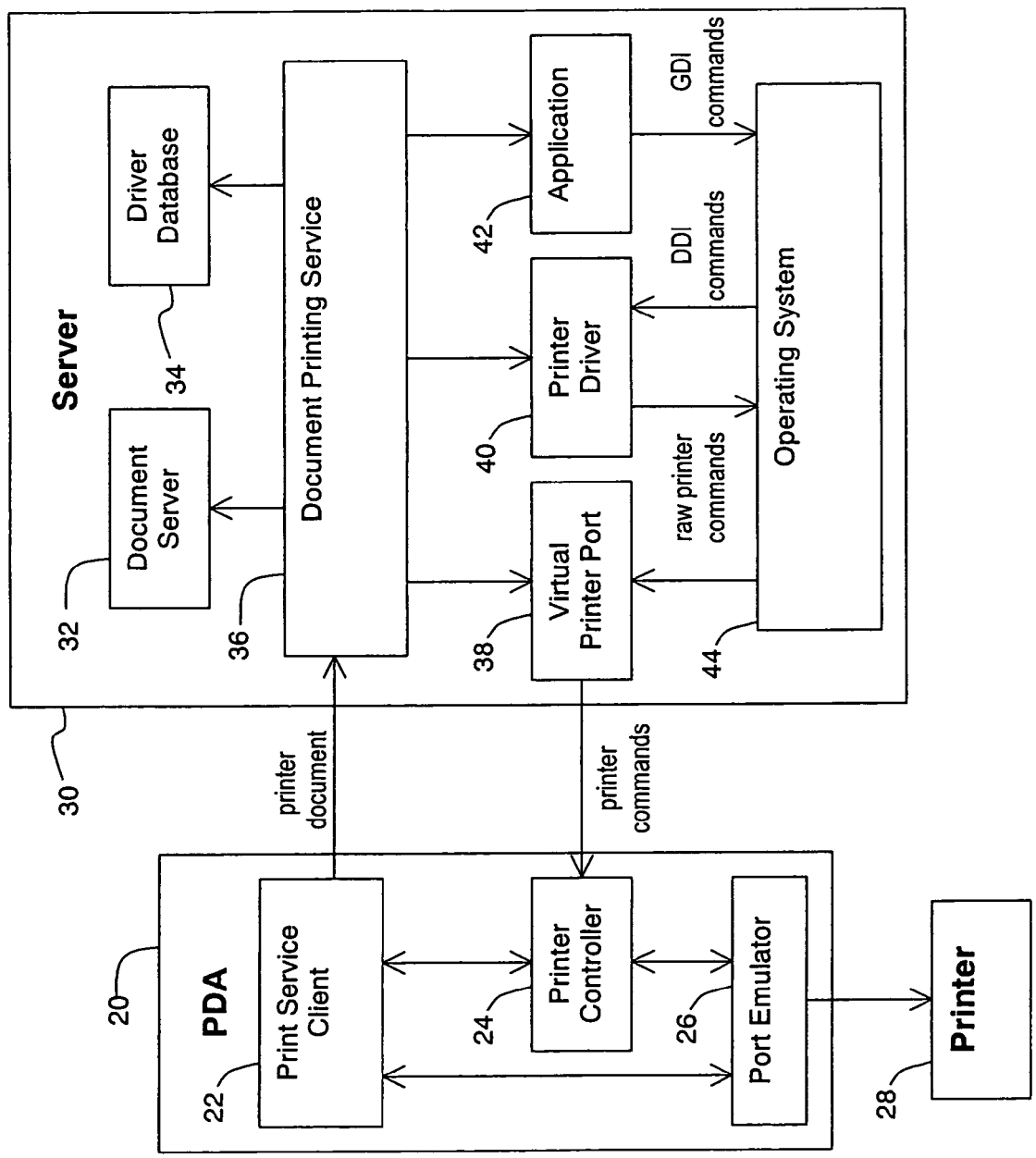
FIG. 3 is a block diagram showing a distributed printing system according to a first embodiment of the present invention.

FIG. 3 is a block diagram showing a distributed printing system according to an embodiment of the present invention. The distributed printing system comprises a PDA 20, a printer 28 and a server 30. The PDA 20 is in communication with the printer 28 and the server 30. The PDA 20 comprises a print service client 22, a printer controller 24 and a port emulator 26. The print service client 22 is in communication with the port emulator 26 and the printer controller 24, the latter two of which are also in direct communication with each other. The server 30 comprises a document printing service 36 in communication with a document server 32, a driver database 34, a virtual printer port 38, a printer driver 40 and an application program 42. The latter three of these are in communication with an operating system 44 of the server 30.

Figure 4:
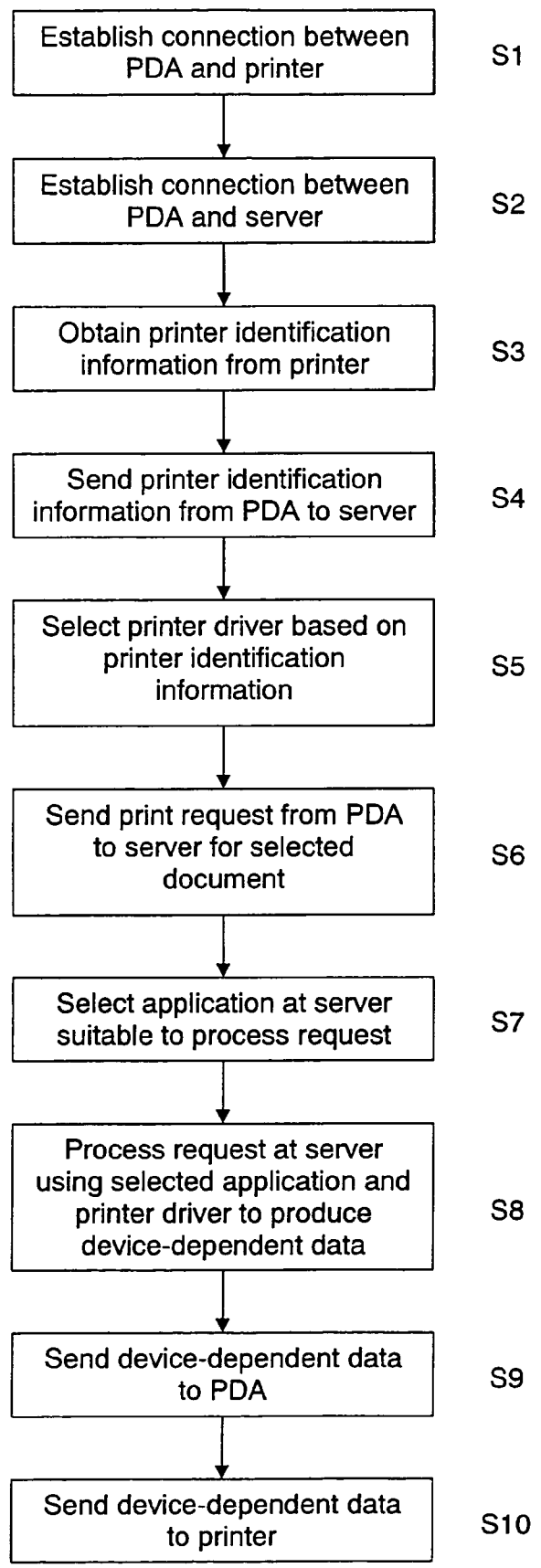
FIG. 4 is a flow diagram for use in explaining operation of the distributed printing system shown in FIG. 3.

Operation of the distributed printing system shown in FIG. 3 will now be described with reference to the flow diagram in FIG. 4.

The client software 22 on the PDA 20 establishes a connection to the printer 28 via a communication port (step S1). In this embodiment the communication port is supplied by the port emulator 26, which transmits and receives data over a wireless link, such as Bluetooth or IrDA. The client PDA 20 then establishes a connection to the document printing service 36 of the server 30 over the network (step S2).

The client software 22 obtains information about the type (e.g. make and model) of the printer 28 (step S3). For example, the Plug and Play External COM Device Specification presents a mechanism to provide automatic configuration of peripheral devices connected by serial communication ports, and there are similar specifications for parallel ports and other types of connection. The majority of printers designed for use with personal computers comply with Plug and Play specifications, which allow automatic identification of the type of a peripheral device.

The PDA 20 then sends information about the printer type of the printer 28 to the server 30 (step S4). The server 30 uses the printer type information to look up the required printer driver in the driver database 34 (step S5). The driver database 34 is assumed to supply a matching device driver for the printer 28. The PDA 20 sends a print request to the server 30 for the requested document (step S6).

The server 30 then creates the virtual printer port 38. A virtual communication port is a software component that appears to the operating system 44 as the interface to a physical communication port. Any data written to or read from the port is sent to or received from some other process, rather than a device attached to a physical port. In this case, data written to the virtual printer port 38 is sent over the network to the PDA 20, from where it is sent via the port emulator 26 to the printer 28.

In the context of an operating system, a "printer" can generally be viewed as an association between a device driver, such as the printer driver 40 of FIG. 3, and a communication port, such as the virtual printer port 38 of FIG. 3. The exact process of configuring the printing system depends upon the server's operating system. In the case of the Windows® operating system, the printer is configured by specifying the port and device driver together with a print processor and port monitor. In this way, the system can be configured so that printing can take place using the previously-selected device driver and the virtual printer port.

To complete the set-up, the client PDA 20 creates the printer controller 24, which controls the flow of data between the virtual printer port 38 and the port emulator 26.

The server 30 retrieves the requested document from the document server 32 and the application associated with the document (step S7). It is assumed that the system is able to associate the document with the correct application. For example, in the Windows® operating system the association is determined by the use of filename extensions. Alternatively, the user, using the client interface, may specify the application explicitly.

The application 42 is executed and instructed to print the document to the printer previously created by the document printing service 36. The ways in which this can be done depend on the operating system and the application. Typically, the application 42 is executed and the document is printed by specifying the application, the document's file path and the printer name as parameters in a command-line. Under the Windows® operating system, a shell print command is often associated with a document type. In that case, it is sufficient to set the printer as the default printer for the system, and then execute the shell print command for the document.

When printing the document, the application issues Graphical Device Interface (GDI) commands to the operating system's graphics API (application programming interface). The operating system 44 converts calls to the graphics API into Device Driver Interface (DDI) calls, which the printing system sends to the device (printer) driver 40 to produce device-specific raw print commands (step S8).

The printing system writes the device-specific printer commands to the virtual printer port 38, which in turn sends the data across the network to the printer controller 24 on the PDA 20 (step S9). The printer controller 20 transfers the print data received from the server 30 to the printer 28 via the port emulator 26 (step S10).

In summary, the operation of a distributed printing system according to the present embodiment involves the following processes: (a) automatically identifying and loading the appropriate device-driver for the given printer; (b) transferring output from the server's printing system to the printer via the mobile device; (c) the use of software applications on the server to process documents for printing; (d) the automatic configuration of the server printing system, using the device driver obtained by (a), so that output from an application is further processed to produce printer-specific data, and that the data is transferred by process (b) to the printer; and (e) the control of the above processes from the mobile device.

The speed at which the virtual printer port 38 receives data is likely to outstrip that at which data can be sent to the printer 28. To minimise the amount of memory required for buffering on the client PDA 20, the printer controller 24 can remotely control the virtual printer port 38 so that the print data is buffered on the server-side 30.

Although the driver database 34 is shown in the present embodiment as being located in the server 30, it is also possible that the driver database 34 could be located in a centralised web service providing a large, regularly-updated database of printer drivers. Such a driver database 34 in the centralised web service could be accessed and downloaded by the document printing service 36, enabling the system to support a wide variety of printers. Once downloaded, frequently-used drivers could be cached locally by the server 30.

A distributed printing system embodying the present invention allows the use of printers on an ad-hoc basis, without the user having to configure the client or server for each printer. The system can work for any printer for which a driver is available for the server operating system. An infrared port, Bluetooth connection or wireless LAN connection would enable wireless connection from the PDA.

The applications, fonts, printer drivers and operating system components (graphics and printing subsystem) required to support them are located on the server, rather than the PDA. As well as minimising the burden on the PDA, this avoids such compromises as converting documents to generic formats.

The distributed printing system identifies the printer and loads the appropriate device driver, using a driver database. This avoids the compromise of using a "universal" printer driver. As mentioned above, to avoid burdening the server with every possible printer driver, the driver database could be in a separate system, possibly a web service, shared among multiple servers and possibly distributed.

Data sent from the server 30 to the PDA 20 is already rendered into printer commands. This has the following technical advantages. No processing of print data takes place on the PDA 20 and only the data that is sent to the printer passes through the PDA 20. This reduces the processing that is required to be performed by the PDA 20. Data may be streamed from the server 30 to the PDA 20, thereby conserving storage on the PDA 20 and saving time by starting printing before all the data is received. On the other hand, pre-rendered print data may be less compact than the source document. However, the print data could be compressed on the server 30 and decompressed at the client PDA 20.

The system can support two-way communication with the printer 28. If, for example, the printer 28 runs out of paper, the printer controller 24 can receive such notification. In response to the problem, the client can notify the user and instruct the server 30 to suspend the transfer of print data from the virtual printer port 38 until the printer 28 is ready.

No modifications to the server's operating system are necessary. A distributed printing system embodying the present invention can make use of standard operating system features and components. Nor does the printer 28 have to be connected to a network or the Internet.

A distributed printing system embodying the present invention allows the user of a resource-limited mobile information device to print a document on a nearby printer, without having the document data, application software, a full graphical printing system, fonts and printer drivers installed on the mobile device. In this way the burden on the resource-limited information device is reduced.

The system uses software and data located on a remote server to provide most of the storage and processing required for printing documents. Application and system software running on the server are used to provide the system with document-rendering capabilities equivalent to a desktop PC. The role of the mobile device is limited to providing a user-interface, transfer of data between server and peripheral device, and controlling the process.

The system requires that the mobile information device (a PDA in the above-described embodiment, but which can be any sufficiently functional mobile information device) can communicate with a nearby printer. The communication between the PDA and printer can be via an emulated serial port connection over a wireless link, such as IrDA or Bluetooth as described above in relation to the above-described embodiment. Alternatively, the connection could be a real parallel or serial printer cable, USB, or LAN, or any other suitable link.

The PDA also requires a connection to the remote server over a network. This connection could be over a LAN, WAN, Internet or telephone network, or any other suitable communications link, for example a mobile telecommunications link.

The server requires access to the document that has been selected for printing. An embodiment of the present invention is not concerned with the method for browsing and selecting documents for printing, but assumes that a document has already been selected for printing and is accessible in some way to the server. In the above-described embodiment the document data was sent from the PDA 20 to the server 30 and stored on the server 30. Alternatively, the document may be obtained from a document server on another machine, or accessed using a URL (or any other type of document reference used to locate the document), and downloaded to the server. Thus the document server may be a web server (where the document may be a web page or a file linked to from a web page), or it may be a peer-to-peer file sharing server, or any other type of server able to provide a document on request.

In the above-described embodiment, the system is implemented by a software service (called the printing service) running on the server, together with client software running on the PDA.

In the context of the above-described embodiment, the term "resource-limited" means having insufficient processing speed and/or resources, for example memory/storage resources, for conventional print processing tasks, with the likelihood that the performance of print processing tasks may often take too long or require more memory than is available on the device. An embodiment of the present invention is especially useful for such resource-limited devices since the burden on the device is reduced. However, it is to be understood that a system embodying the present invention may be useful even when the information device is not resource-limited as such, if there is some other reason why it is necessary or preferable for processing to take place off the device. For example, an embodiment of the invention may be used where the information device cannot control the peripheral device directly because a suitable driver isn't available at the device, or where downloading and installing a driver would be undesirable (perhaps for security reasons).

Although the description above is for an embodiment in which the peripheral device is a printer, the methods described are equally applicable to the use of other hardware. The requirement for hardware is that: (a) the device is connectable via a standard I/O port connection, including serial, parallel, USB, VGA and wireless connections such as Bluetooth or IrDA; and (b) a device driver is available for the server operating system together with applications capable of input and/or output with such a device. This includes embodiments in which the peripheral device is a graphical or textual output device other than a printer.

Further embodiments include those in which the peripheral device is a scanner, camera or other graphical input device. In the case of an input device, the output from the device is transferred from the peripheral device to drivers and applications on the server for processing and/or storage.

Figure 5:
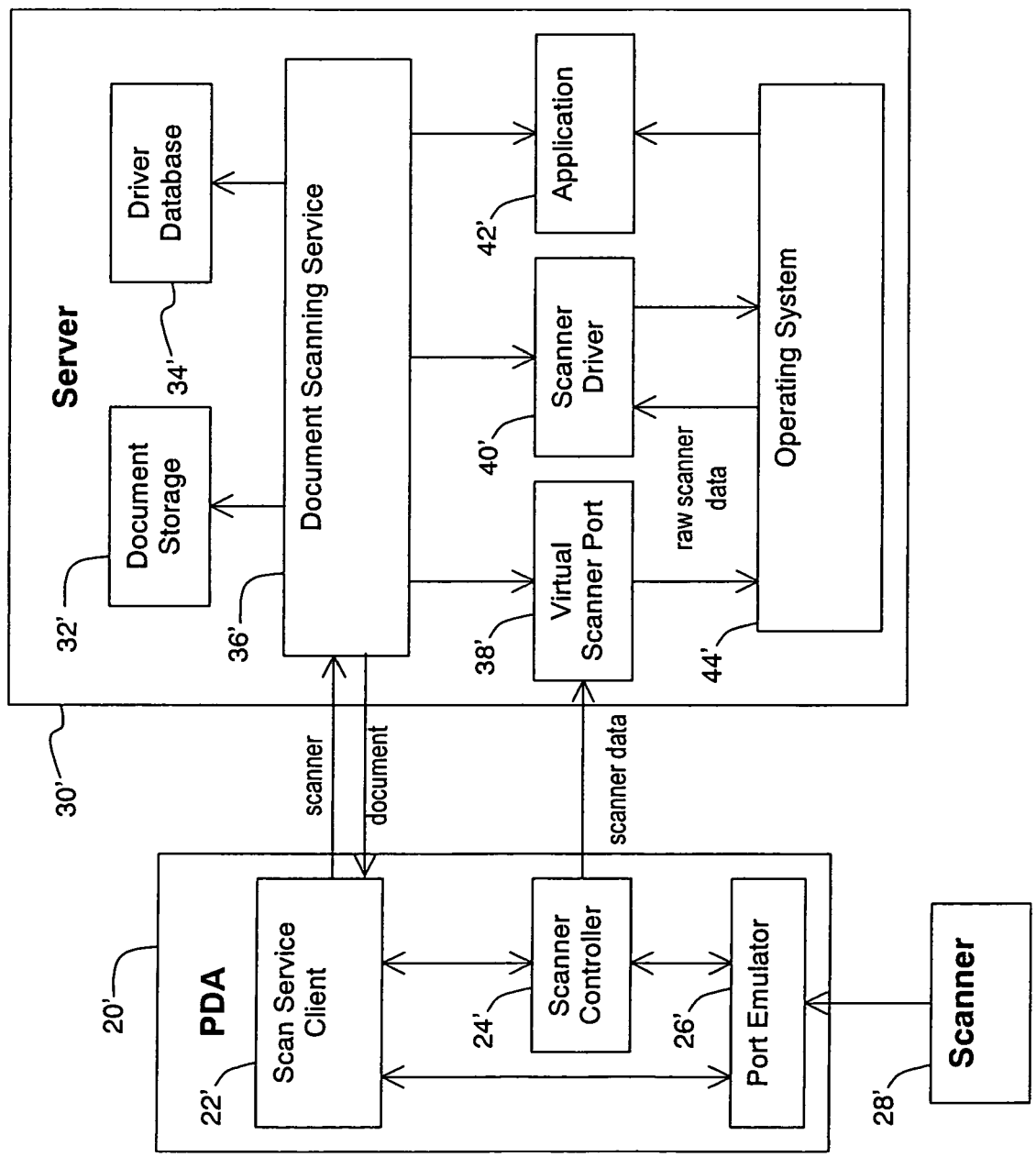
FIG. 5 is a block diagram showing a distributed scanning system according to a second embodiment of the present invention.

FIG. 5 is a block diagram showing a distributed scanning system according to a second embodiment of the present invention. The distributed scanning system comprises a PDA 20', a scanner 28' and a server 30'. The PDA 20' is in communication with the scanner 28' and the server 30'. The PDA 20' comprises a scan service client 22', a scanner controller 24' and a port emulator 26'. The scan service client 22' is in communication with the port emulator 26' and the scanner controller 24', the latter two of which are also in direct communication with each other. The server 30' comprises a document scanning service 36' in communication with a document storage portion 32', a driver database 34', a virtual scanner port 38', a scanner driver 40' and an application program 42'. The latter three of these are in communication with an operating system 44' of the server 30'. Operation of the distributed scanning system shown in FIG. 5 is very similar to operation of the distributed printing system described above with reference to FIGS. 3 and 4, and it will be readily apparent to the person skilled in the art how to modify the teaching of the distributed printing system (where the peripheral device is an output device) to enable a distributed scanning system (where the peripheral device is an input device). Similar or corresponding parts are labelled with the same reference numeral in FIGS. 3 and 5 but are distinguished by a prime symbol; for example the printer of FIG. 3 has a reference numeral 28 and the scanner of FIG. 5 has a reference numeral 28'.

Although in the above-described embodiment all data processing takes place on the server, it can also be applied so that further processing is done on the mobile device. This includes embodiments in which the application is a distributed application, consisting of a user interface running on the PDA and server programs that perform most of the data processing. Further examples of possible client-side processing include but are not limited to the following: creating a smaller set of data from the original document (such as selecting a single page from a word processor document for printing); putting data from a database or XML document into a displayable format, such as HTML; an application program that outputs data in a graphical format, such as a drawing program; and any case in which a document is generated by a program running on the client device.

Although it is described above as the server 30/30' has access to a driver database 34/34' having a plurality of device drivers, it will be appreciated that the server 30/30' could have access only to a single, generic, device driver suitable for use with a number of peripheral devices 28/28'.

The operations performed by the mobile device and other parts of the distributed peripheral device control system to control the interaction between the mobile device and the peripheral device can be implemented in hardware or as an operating program running on the mobile device and on other parts of the distributed peripheral device control system. The operating program may be stored on a computer-readable medium or it could, for example, be embodied in a signal such as a downloadable data signal provided from an Internet website. The appended claims are to be interpreted as covering an operating program by itself, or as a record on a carrier, or as a signal, or in any other form.

What is claimed is:

1. A distributed peripheral device control method for controlling the interaction between an information device and a peripheral device in communication with the information device, comprising requesting the peripheral device to perform a specified task, sending device identification information identifying the peripheral device to a server in communication with the information device, the server having access to at least one peripheral device driver, selecting a device driver corresponding to the peripheral device in dependence upon the device identification information, establishing a virtual port at the server to form part of a communications link between the server and the information device and associating the virtual port with the selected device driver, employing the server to perform, on behalf of the information device and using the selected device driver, peripheral device-dependent processing operations relating to the performance of the task to produce device-dependent data, and sending the device-dependent data to the virtual port for onward transmission to the peripheral device via the information device to enable the peripheral device to perform the specified task.

2. A method as claimed in claim 1, wherein the virtual port is established and associated with the selected device driver so as to appear to an operating system of the server to be an interface to a physical port to which the peripheral device is attached but wherein any data sent to the virtual port are forwarded to the information device over the communications link rather than directly to the peripheral device.

3. A method as claimed in claim 1, wherein the server has access to a plurality of applications, further comprising the step of selecting an application in dependence upon the specified task to be performed, and wherein the device-dependent processing operations are performed in interaction with the selected device driver under control of the selected application.

4. A method as claimed in claim 1, wherein the server has access to a plurality of applications for performing device-independent processing operations and further comprising the steps of selecting an application and employing the server to perform device-independent processing operations on behalf of the information device using the selected application.

5. A method as claimed in claim 4, wherein the application is selected in dependence upon on the specified task to be performed.

6. A method as claimed in claim 1, further comprising the step of buffering the device-dependent data at the server to control the rate at which the data are sent to the information device.

7. A method as claimed in claim 6, wherein the buffering of the device-dependent data at the server is controlled in dependence upon a control signal received from the peripheral device indicating the state of the peripheral device.

8. A method as claimed in claim 6, wherein the buffering of the device-dependent data at the server is controlled in dependence upon the fullness of a memory used to buffer the device-dependent data at the information device.

9. A method as claimed in claim 1, further comprising the step of buffering the device-dependent data at the information device to control the rate at which the data are sent to the peripheral device.

10. A method as claimed in claim 1, wherein the information device begins to send device-dependent data to the peripheral device before all the device-dependent data necessary to perform the specified task are received from the server.

11. A method as claimed in claim 1, further comprising the steps of compressing the device-dependent data at the server and decompressing the device-dependent data at the information device.

12. A method as claimed in claim 1, further comprising the step of processing of the device-dependent data at the information device before sending it to the peripheral device.

13. A method as claimed in claim 1, wherein the peripheral device comprises an output device.

14. A method as claimed in claim 13, wherein the output device is a printer, the specified task is to perform a printing operation to print a selected document and the device-dependent data are printer commands.

15. A method as claimed in claim 14, further comprising the step of sending the selected document from the information device to the server.

16. A method as claimed in claim 14, further comprising the step of retrieving the selected document from a document server.

17. A method as claimed in claim 16, wherein the document server is located in a separate device that is accessible by the server.

18. A method as claimed in claim 14, comprising the step of selecting an application on the server by examining the document type.

19. A method as claimed in claim 18, wherein the application is selected by examining the filename extension of the document.

20. A method as claimed in claim 1, wherein the peripheral device comprises an input device.

21. A method as claimed in claim 20, wherein the input device is a scanner, the specified task is to perform a scanning operation to scan a document and the device-dependent data are scanner commands for controlling the scanner to perform the specified task.

22. A method as claimed in claim 1, wherein the communication link is a first communication link and the information device is in communication with the peripheral device via a second communication link and further comprising the step of creating a virtual port at the information device for forming part of the second communication link.

23. A method as claimed in claim 1, wherein the communication link is a first communication link and the information device is in communication with the peripheral device via a second communication link and further comprising the step of creating a virtual port at the information device for forming part of the first communication link.

24. A method as claimed in claim 1, further comprising the step of obtaining the device identification information from the peripheral device by Plug and Play specifications.

25. A method as claimed in claim 1, wherein at least one of the plurality of peripheral device drivers is located in the server.

26. A method as claimed in claim 1, wherein at least one of the plurality of peripheral device drivers is located in a separate device driver server that is accessible by the server.

27. A method as claimed in claim 1, wherein the steps are controlled by the information device.

28. A method as claimed in claim 1, wherein the or each virtual port is established under the control of the information device.

29. A method as claimed in claim 1, wherein the information device is a resource-limited information device.

30. A method as claimed in claim 1, further comprising the step of performing peripheral device-independent processing operations at the information device.

31. A method as claimed in claim 1, wherein the server has access to a plurality of peripheral device drivers.

32. An operating program for controlling an information processing device or a distributed peripheral device control system to perform a method as claimed in claim 1.

33. An operating program as claimed in claim 32, carried on a carrier medium.

34. An operating program as claimed in claim 33, wherein the carrier medium is a transmission medium.

35. An operating program as claimed in claim 33, wherein the carrier medium is a storage medium.

36. A distributed peripheral device control method for controlling the interaction between an information device and a peripheral device in communication with the information device, comprising requesting the peripheral device to perform a specified task to produce device-dependent data, sending device identification information identifying the peripheral device to a server in communication with the information device, the server having access to at least one peripheral device driver, selecting a device driver corresponding to the peripheral device in dependence upon the device identification information, establishing a virtual port at the server to form part of a communications link between the server and the information device and associating the virtual port with the selected device driver, sending the device-dependent data from the peripheral device to the server via the information device for receipt at the virtual port, employing the server to perform, on behalf of the information device and using the selected device driver, peripheral device-dependent processing operations on the device-dependent data received at the virtual port.

37. A method as claimed in claim 36, wherein the virtual port is established and associated with the selected device driver so as to appear to an operating system of the server to be an interface to a physical port to which the peripheral device is attached such that any data received at the virtual port appears to originate from the peripheral device.

38. A method as claimed in claim 36, wherein the server has access to a plurality of applications, further comprising the step of selecting an application in dependence upon the specified task performed at the peripheral device, and wherein the device-dependent processing operations are performed in interaction with the selected device driver under control of the selected application.

39. A method as claimed in claim 38, wherein the device-dependent processing operations performed at the server are for processing the device-dependent data to produce device-independent data for use by the selected application.

40. A method as claimed in claim 36, wherein the server has access to a plurality of applications for performing device-independent processing operations and further comprising the steps of selecting an application and employing the server to perform device-independent processing operations on behalf of the information device using the selected application.

41. A method as claimed in claim 40, wherein the device-dependent processing operations performed at the server are for processing the device-dependent data to produce device-independent data for use by the selected application.

42. A method as claimed in claim 36, wherein the peripheral device comprises an input device for producing the device-dependent data.

43. A method as claimed in claim 42, wherein the input device is a scanner and the specified task is to perform a scanning operation to scan a document.

44. A method as claimed in claim 36, wherein the communication link is a first communication link and the information device is in communication with the peripheral device via a second communication link and further comprising the step of creating a virtual port at the information device for forming part of the second communication link.

45. A method as claimed in claim 36, wherein the communication link is a first communication link and the information device is in communication with the peripheral device via a second communication link and further comprising the step of creating a virtual port at the information device for forming part of the first communication link.

46. A method as claimed in claim 36, further comprising the step of obtaining the device identification information from the peripheral device by Plug and Play specifications.

47. A method as claimed in claim 36, wherein at least one of the plurality of peripheral device drivers is located in the server.

48. A method as claimed in claim 36, wherein at least one of the plurality of peripheral device drivers is located in a separate device driver server that is accessible by the server.

49. A method as claimed in claim 36, wherein the steps are controlled by the information device.

50. A method as claimed in claim 36, wherein the or each virtual port is established under the control of the information device.

51. A method as claimed in claim 36, wherein the information device is a resource-limited information device.

52. A method as claimed in claim 36, further comprising the step of performing peripheral device-independent processing operations at the information device.

53. A method as claimed in claim 36, wherein the server has access to a plurality of peripheral device drivers.

54. An operating program for controlling an information processing device or a distributed peripheral device control system to perform a method as claimed in claim 36.

55. An operating program as claimed in claim 54, carried on a carrier medium.

56. An operating program as claimed in claim 55, wherein the carrier medium is a transmission medium.

57. An operating program as claimed in claim 55, wherein the carrier medium is a storage medium.

58. A distributed peripheral device control system for controlling the interaction between an information device of the system and a peripheral device of the system in communication with the information device, comprising a portion which requests the peripheral device to perform a specified task, a portion which sends device identification information identifying the peripheral device to a server in communication with the information device, the server having access to at least one peripheral device driver, a portion which selects a device driver corresponding to the peripheral device in dependence upon the device identification information, a portion which establishes a virtual port at the server to form part of a communications link between the server and the information device and associates the selected device driver with the virtual port, a portion which employs the server to perform, on behalf of the information device and using the selected device driver, peripheral device-dependent processing operations relating to the performance of the task to produce device-dependent data, and a portion which sends the device-dependent data to the virtual port for onward transmission to the peripheral device via the information device to enable the peripheral device to perform the specified task.

59. A distributed peripheral device control system for controlling the interaction between an information device of the system and a peripheral device of the system in communication with the information device, comprising a portion which requests the peripheral device to perform a specified task to produce device-dependent data, a portion which sends device identification information identifying the peripheral device to a server in communication with the information device, the server having access to at least one peripheral device driver, a portion which selects a device driver corresponding to the peripheral device in dependence upon the device identification information, a portion which establishes a virtual port at the server to form part of a communications link between the server and the information device and associates the selected device driver with the virtual port, a portion which sends the device-dependent data from the peripheral device to the server via the information device for receipt at the virtual port, and a portion which employs the server to perform, on behalf of the information device and using the selected device driver, peripheral device-dependent processing operations on the device-dependent data received at the virtual port.

60. An information processing device adapted for use in a method as claimed in claim 1.

61. An information processing device adapted for use in a method as claimed in claim 36.

62. A server adapted for use in a method as claimed in claim 1.

63. A server adapted for use in a method as claimed in claim 36.

* * * * *